US012802269B2

(12) United States Patent
Xia et al.

(10) Patent No.: US 12,802,269 B2
(45) Date of Patent: Nov. 17, 2026

(54) METHODS AND SYSTEMS FOR CONTACTLESS OBJECT MEASUREMENT

(71) Applicant: Shanghai GND eTech Co., Ltd., Shanghai (CN)

(72) Inventors: Zihuan Xia, Shanghai (CN); Chao Lian, Shanghai (CN); Jie Xu, Shanghai (CN); Gaosheng Shi, Shanghai (CN); Duo Wu, Shanghai (CN); Jie Ji, Shanghai (CN); Qiujin Wang, Shanghai (CN)

(73) Assignee: Shanghai GND eTech Co., Ltd., Shanghai (CN)

( * ) Notice: Subject to any disclaimer, the term of this patent is extended or adjusted under 35 U.S.C. 154(b) by 286 days.

(21) Appl. No.: 18/767,392

(22) Filed: Jul. 9, 2024

(65) Prior Publication Data

US 2026/0017819 A1 Jan. 15, 2026

(51) Int. Cl.

| | |
|---|---|
| ***G06K 9/00*** | (2022.01) |
| ***G01N 21/95*** | (2006.01) |
| ***G06T 7/13*** | (2017.01) |
| ***G06T 7/73*** | (2017.01) |

(52) U.S. Cl.

CPC .......... *G06T 7/74* (2017.01); *G01N 21/9501* (2013.01); *G06T 7/13* (2017.01); *G01N 2201/08* (2013.01); *G06T 2207/30148* (2013.01); *G06T 2207/30164* (2013.01)

(58) Field of Classification Search

CPC ... G06T 7/74; G06T 7/13; G06T 2207/30148; G06T 2207/30164

See application file for complete search history.

(56) References Cited

U.S. PATENT DOCUMENTS

| | | | | | |
|---|---|---|---|---|---|
| 6,011,586 | A * | 1/2000 | Lepior | ..................... | H04N 7/18 348/335 |
| 7,658,816 | B2 * | 2/2010 | Koshiishi | .......... | H01J 37/32642 156/345.43 |
| 2019/0272628 | A1 * | 9/2019 | Tsou | ..................... | G06F 18/214 |
| 2023/0402255 | A1 * | 12/2023 | Lane | ..................... | H01J 37/321 |

FOREIGN PATENT DOCUMENTS

| | | | | |
|---|---|---|---|---|
| JP | 2006208258 A * | 8/2006 | | |
| WO | WO-2017117152 A1 * | 7/2017 | ............. | G06T 7/001 |

* cited by examiner

*Primary Examiner* — Jayesh A Patel
(74) *Attorney, Agent, or Firm* — Yuan Qing Jiang

(57) ABSTRACT

Provided are system and method for contactless precision measurement of the position of the system relative to a nearby object. The system comprises a workpiece, at least one low-profile assembly, and a central control unit. The low-profile assembly comprises a main axis directed to a first direction and approximately parallel to the surface of the workpiece to intersect the inner surface of the object. The assembly further comprises at least one projector for projecting an electromagnetic beam onto the object for the measurement. Both the low-profile assembly and the central control unit are attached on the surface of the workpiece at desired locations. The system can be operated stand alone in an enclosed and dimensional constrained operation environment.

22 Claims, 13 Drawing Sheets

PRIOR ART

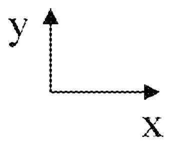
FIG. 8D
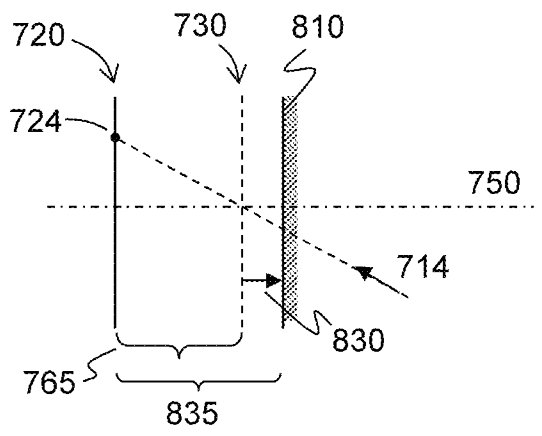
FIG. 8E
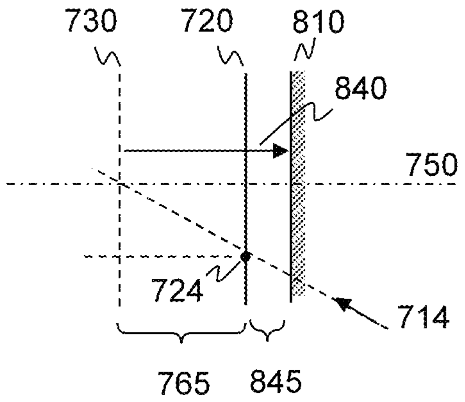

METHODS AND SYSTEMS FOR CONTACTLESS OBJECT MEASUREMENT

BACKGROUND OF THE INVENTION

The present invention relates generally to methods and systems for contactless object measurement, more particularly to precision measurement of the position of the system relative to a nearby object.

Precision position measurement is vitally important across various industries, whether in manufacturing, robotics, aerospace, or healthcare. The ability to accurately determine a position of a workpiece enables precise control, quality assurance, and safety. In manufacturing, it ensures that components fit seamlessly, reducing waste and enhancing product reliability. In robotics, it enables robots to navigate complex environments with accuracy, optimizing workflows and minimizing errors. In semiconductor industry, the tiniest deviations in position can lead to significant defects, the ability to precisely measure positions is crucial. Semiconductor fabrication involves intricate patterning and deposition of materials on wafer surfaces, with tolerances often measured in nanometers. Accurate positioning ensures that lithographic masks align perfectly, enabling the creation of intricate circuitry with high resolution. Moreover, precise positioning is essential during the assembly and packaging stages, ensuring that individual semiconductor components are placed accurately on substrates or within packages. Any misalignment or error in position could result in faulty chips, leading to yield loss and compromised product performance. Therefore, in the semiconductor industry, precision position measurement is not just important; it's fundamental to achieving the quality and reliability demanded by modern electronics applications.

As an example of precising position control in semiconductor fabrication, FIGS. 1A, 1B, and 1C depict a plasma dry etching system. Dry etching process is used to pattern thin films on semiconductor wafers, which is generally positioned in the center of the etching stage. Unlike wet etching, which uses liquid chemicals to remove material, dry etching involves the removal of material through physical or chemical means in a gas phase, typically in a vacuum chamber. In such system 100 in FIGS. 1A, 1B, and 1C, a combination of reactive gases such as fluorine-based compounds and an inert gas like argon is introduced into the chamber through a shower head on the upper electrode 112. Radiofrequency energy generated by RF power network 110 is then applied to create a plasma 114, which ionizes the gases. These ions bombard the material to be etched, breaking chemical bonds and causing it to be ejected from the surface. The selectivity of the etching process can be controlled by adjusting the gases and parameters such as pressure and power.

With the miniaturization and high integration of semiconductor products, the characteristics of manufactured semiconductor devices have increasingly been influenced by non-uniformities of the dry etching process. The fluxes of ions and radicals toward the wafer are influenced by the electrical and chemical properties of the surface material. Generally, it is more difficult to maintain uniform ambiance across an edge region of the wafer because the surface material inevitably changes abruptly at the wafer's edge. A material discontinuity leads to discontinuities in properties such as electrical impedance and chemical reactivity that alter the ion and radical fluxes near the edge. This results in locally non-uniform plasma processing which, in turn, may result in increased yield loss of functional IC units in the edge region.

A known solution to improve dry etching uniformity near the edge of a semiconductor wafer is to dispose a focus ring 122 on a wafer chuck on the bottom electrode 116. As shown in FIGS. 1A, 1B, and 1C, a semiconductor wafer 120 is placed concentrically with the focus ring. From a side view (FIG. 1C, x-z plane), a top surface of the focus ring 122 is of a height approximately identical to that of a surface of the semiconductor wafer 120. As a result, an electric field above the focus ring 122 becomes approximately identical to that above the surface of the semiconductor wafer 120, whereby reducing discontinuity in a bias potential due to a fringing effect. Thus, a plasma sheath over the surface of the semiconductor wafer and that over the focus ring become of an approximately same height. By such arrangement, incident ions fall vertically on the surface of the semiconductor wafer even in a peripheral portion of the semiconductor wafer. (see, for example, U.S. Pat. No. 7,658,816, US Patent Application Publication 2023/0402255).

In order to use a focus ring to improve the processing uniformity, a wafer and the focus ring should be placed concentrically. Any deviation from concentric arrangement will result in a fringing effect resulting in a nonuniform etching near the edge of a wafer. However, it is difficult to monitor the wafer position relative to the focus ring in a plasma processing chamber.

U.S. Pat. No. 6,011,586 discloses a camera system to monitor the location of the edge of the wafer. In this system, a camera is positioned perpendicularly and above the wafer to capture the image of the wafer's periphery. In order to reduce the working distance between the camera and the wafer, plurality of reflective mirrors placed 45 degrees on the optical path to fold the optical path and shorten the working distance in the vertical direction. However, such system may not be suitable for being mount inside a plasma chamber, since any modification to the system may disturb plasma distribution.

Furthermore, it is challenging to make an accurate position measurement without blocking robot operation for wafer handling in a vacuum chamber. The gap, 125, between the edge of the wafer and the inner edge of the focus ring is small (0 to a few mm), and the height difference, 126, between the surface of the semiconductor wafer and that over the focus ring is small (about 1 mm), a sensitive measurement is required for the sub mm precision. Therefore, there is a need to develop a system and methods for object measurement in a dimensional constrained environment.

SUMMARY OF THE INVENTION

According to aspects illustrated here, provided are a contactless system and method to precisely determine a gap between a workpiece and an object nearby. More particularly, provided is a stand-alone system which can be operated in an enclosed and dimensional constrained environment. Furthermore, provided is a system capable of measuring the gap between a workpiece and an object even though the surface of the workpiece may be leveled to the top of the nearby object.

In various aspect, the present disclosure provides a contactless system comprising a workpiece, at least one low-profile assembly, and a central control unit. The control unit comprises a power source and an image processor. The control unit and the low-profile assembly are attached to a surface of the workpiece.

In various aspect of the present invention, the assembly comprises a main axis directed to a first direction and approximately parallel to the surface of the workpiece to intersect the inner surface of a nearby object.

In various aspect of the present invention, the assembly further comprises at least one projector for projecting an electromagnetic beam onto an object, wherein the beam is configured to intersect with the main axis at a reference plane. The projection of the beam produces a beam spot on a surface of an object. The separation between the spot and the main axis along a second direction is proportional to the distance from the surface of the object to the reference plane.

In various aspect of the present invention, alternatively, the assembly includes a first and a second projector for projecting a first and a second electromagnetic beam onto an object, wherein the first and the second beam are configured to be symmetrical about the main axis and to intersect with each other at a reference plane. The projections of the first and second beam produce a first and second beam spots on a surface of an object. The separation between the first and second spot along a second direction is proportional to the distance from the surface of the object to the reference plane.

In various aspect of the present invention, the assembly further comprises a focusing means centered on the main axis for focusing the reflected beam of the spot from the object surface, and forming an image of the spot on an image plane.

In various aspect of the present invention, the assembly further comprises an imaging sensor array placed at the image plane and coupled with the image processor in the control unit to determine the position of the image of the spot on the image plane, and to derive the gap between the edge of the workpiece and the surface of the object nearby.

In various aspect of the present invention, the contactless system comprises at least three of the assemblies which are attached on a workpiece and are aligned their main axis to different directions to detect the position of the workpiece relative to its surrounding object.

BRIEF DESCRIPTION OF DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

FIG. 8A, FIG. 8B, FIG. 8C, FIG. 8D, and FIG. 8E illustrate various relationships between object surface, reference plane, and the edge of a workpiece for the assemble shown in FIG. 7.

DETAILED DESCRIPTION OF THE INVENTION

In the following detailed description of the embodiments of the invention, numerous specific details are set forth in order to provide a thorough understanding of the embodiments of the invention. However, it will be obvious to one skilled in the art, that the embodiments of the invention may be practiced without these specific details. In other instances well known methods, procedures, components and circuits have not been described in detail so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and the scope of the invention.

One of the objectives of the present invention is to provide a contactless system and method to precisely determine the gap between a workpiece and an object nearby. More particularly, provided are a contactless system and method being suitable for the gap measurement in an environment where several requirements for the system, such as low-profile, light-weight, and clearance near the edge of the workpiece have to be met. Furthermore, provided is a system capable of measuring the gap between a workpiece and an object even though the surface of the workpiece may be leveled to the top of the nearby object.

Figure 2A:
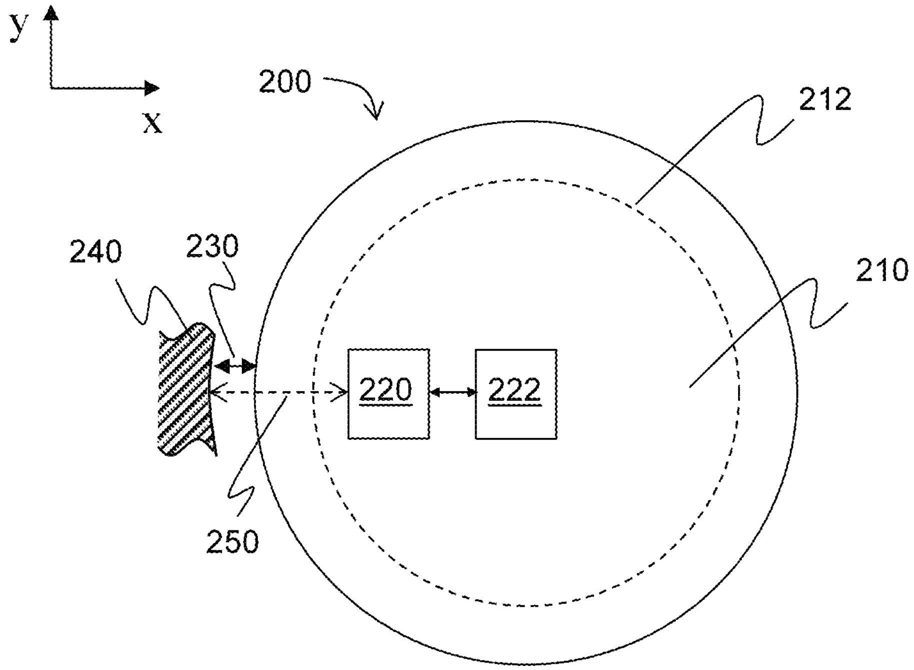
FIG. 2A and FIG. 2B are illustrations of a system for contactless object measurement according to some embodiments of the present disclosure.
Figure 2B:
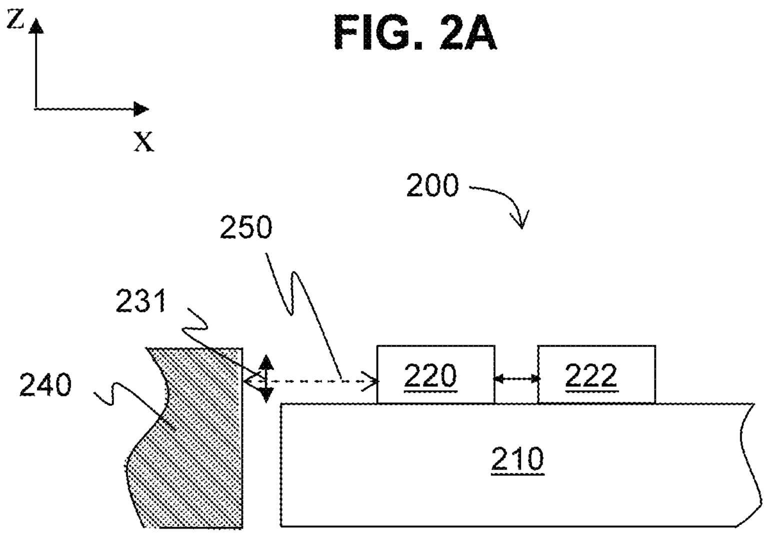

With reference to FIGS. 2A and 2B, the contactless object measurement system 200 comprises a workpiece 210, at least one low-profile assembly 220, and a central control unit 222. The control unit may include an image processing electronics, data storage memory, and a power source. The control unit may also include data communication electronics for wired or wireless communication. The power source in the control unit is responsible to power various components in the system 200. In one embodiment, the power source is a battery such as a primary or rechargeable battery, wherein the rechargeable battery may be charged by an external power supply with a cable connection, or it can be charged remotely such as with an RF power source or light source.

The low-profile assembly 220 projects electromagnetic beams 250 near the surface of the workpiece to probe the inner edge of a nearby object 240. Both the low-profile assembly 220 and the central control unit 222 are attached on the surface of the workpiece 210 at desired locations. The system 200 can be operated stand-alone in a dimensional constrained operation environment.

For clear descriptions of the system configuration, a right-hand Cartesian coordinate system (x, y, z) is used. A first, second, and third direction is defined as a direction along x-axis, y-axis, and z-axis respectively.

In one embodiment, the workpiece 210 is a wafer, such as a semiconductor wafer, a ceramic wafer, or any other materials in a wafer form. In a typical semiconductor processing environment, automated robot handling requires a clear zone near the wafer edge for robot grabbing and positioning the wafer. The area from boundary 212 to wafer edge is defined as the clear zone. The robot system utilizes the clear zone to exam the condition of a loaded wafer to verify the integrity of the wafer and to identify that only one wafer is loaded at a given location. Therefore, the assembly 220 and the central control unit 222 should be mounted inside the boundary 212 to avoid interference when the robot system to exam the wafer. Another restriction for system 200 is the maximum height above the wafer. For a batch processing system, the distance between each wafer in z-axis is about 3-6 mm. In other application environment, the space above a wafer may be smaller than 4 mm. For this reason, the assembly 220 and the central control unit 222 are constructed to be low-profile, within a few mm height in z-direction, so that the entire system 200 can fit into a typical wafer operation environment. The combination of the restriction of height and maintaining a clear zone near the edge of a wafer defines the dimensional constrain for the contactless measurement 200. Various embodiments of constructing a low-profile assembly will be described in details in the following descriptions.

Figure 1A:
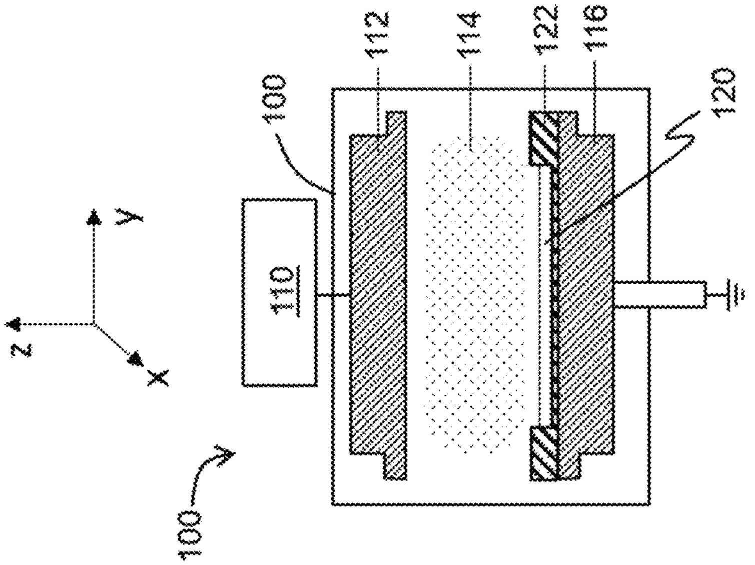
FIG. 1A, FIG. 1B, and FIG. 1C illustrate a prior art plasma chamber with a focus ring surrounding a loaded wafer.
Figure 1B:
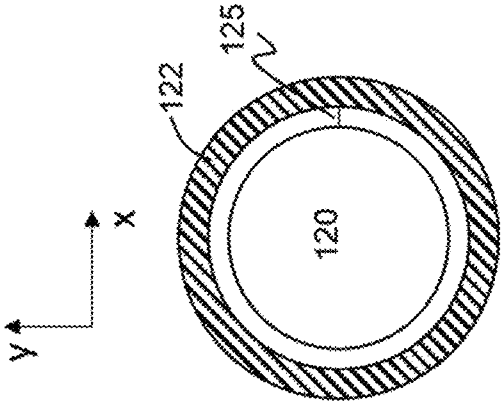
Figure 1C:
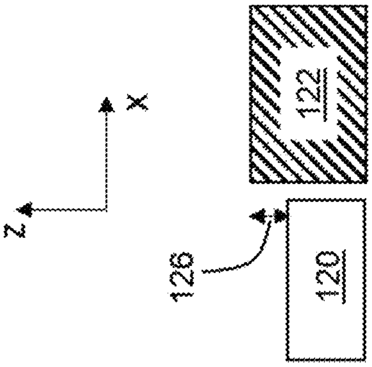

The nearby object 240 can be a focus ring placed on the lower electrode of a wafer chuck in a plasma chamber. As shown in FIGS. 2A and 2B, when the wafer is disposed inside the focus ring, there is a gap 230 between the wafer edge and the inner surface of the ring. Typically, the top surface of object 240 is slightly higher than the wafer 210. The height difference 231 in z-axis ranges from a sub millimeter to a few millimeters. The gap 230 between the workpiece 210 and the inner surface of object 240 ranges from 0 to a few millimeters. In an application environment such as shown in FIGS. 1A, 1B, and 1C, the system 200 can be used as a test wafer to verify the accuracy of robot operation and to diagnostic non-uniformity processing problem.

Figure 3:
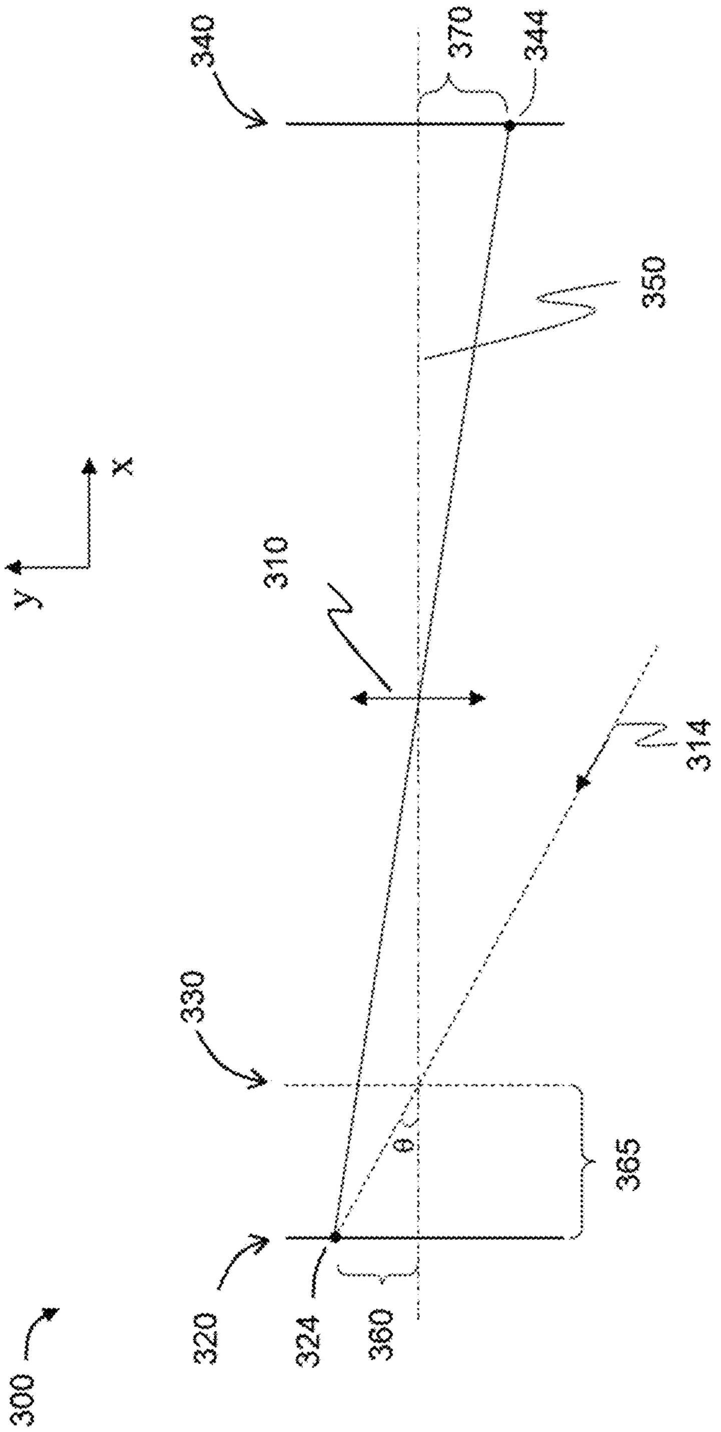
FIG. 3 is a ray tracing diagram of an assembly according to some embodiments of the present disclosure.

FIG. 3 provides an example of the low-profile assembly 220 according to one embodiment of the present invention. As shown in FIG. 3, a main axis 350 directed to a first direction (x-axis) and approximately parallel to the surface of the workpiece 210 to intersect the inner surface 320 of a nearby object. The assembly includes a projector for projecting an electromagnetic beam 314 onto the surface of the object, wherein the beam is configured to intersect with the main axis 350 at a reference plane 330. The projection of the beam produces a beam spot 324 on the surface of an object surface 320. The distance 365, $d_{obj}$, from the object surface 320 to the reference plane 330 along x-axis is proportional to $d_{360}$ which is the separation between the beam spot 324 and the main axis 350 along y-axis:

$d_{obj}=d_{360}\times\cot\theta$, where θ is the angle between the main axis 350 and the incident beam 314. cot θ can be obtained by a calibration from a set of known $d_{obj}$ and $d_{360}$.

With continued reference to FIG. 3, the assembly 300 further comprises a focusing means 310, such as a focus lens, centered on the main axis for focusing the reflected beam of the spot 324 from the object surface, and forming an image of the spot 344 on an image plane 340. The separation 370, $d_{370}$, between the image spot 344 and the main axis 350 along y-axis is proportional to the separation 360, $d_{360}$, and in turn is proportional to the distance 365, $d_{obj}$. Therefore, $d_{obj}$ can be determined according to $d_{370}$.

Figure 4A:
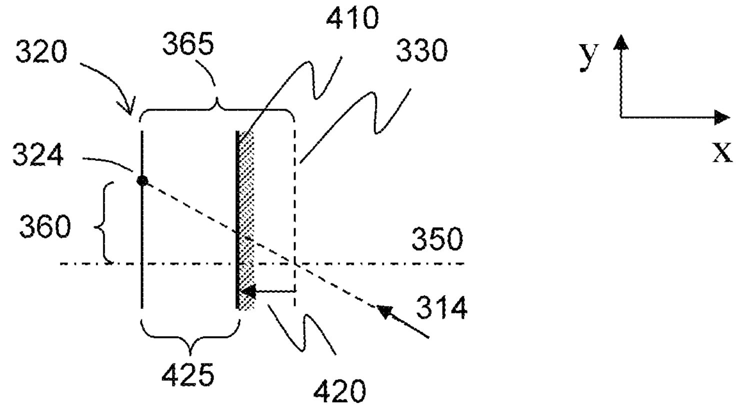
FIG. 4A, FIG. 4B, and FIG. 4C illustrate various relationships between object surface, reference plane, and the edge of a workpiece for the assemble shown in FIG. 3.
Figure 4B:
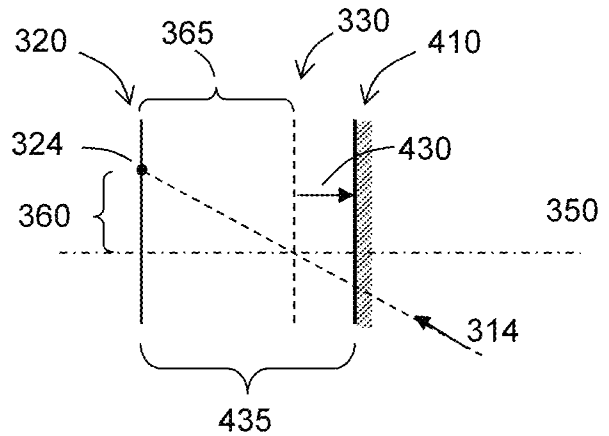
Figure 4C:
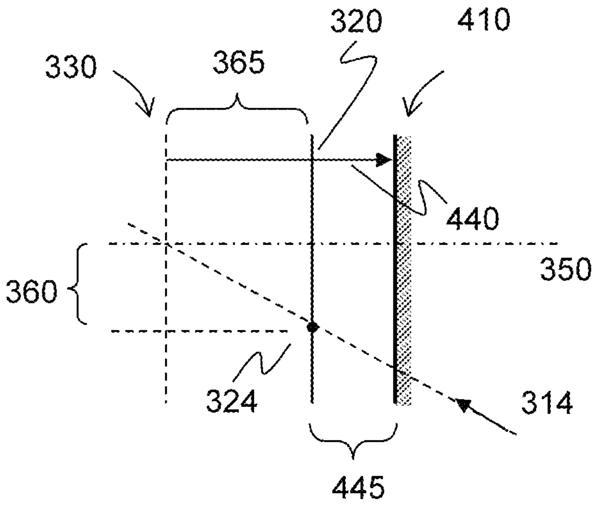

FIGS. 4A, 4B, and 4C illustrate various relationships between the object surface 320, reference plane 330, and an edge of a wafer 410 for the assemble shown in FIG. 3. Shown in FIG. 4A, on the x-y plane, the reference plane 330 is on right side of the object surface 320 and the edge 410 of the wafer is located on the left side of the reference plane 330. The incident beam 314 forms beam spot 324 above the main axis in y-direction. The gap 425 between the edge of the wafer and the inner surface of an object equals to distance 365, $|d_{obj}|$ minus distance 420, $|d_{420}|$.

In FIG. 4B, the reference plane 330 is on right side of the object surface 320 and the edge 410 of the wafer is located on the right side of the reference plane 330. The incident beam 314 forms beam spot 324 above the main axis in y-direction. The gap 435 between the edge of the wafer and the inner surface of an object equals to distance 365, $|d_{obj}|$ plus distance 430, $|d_{430}|$.

In FIG. 4C, both object surface 320 and the edge 410 of the wafer are located on the right side of the reference plane 330. The incident beam 314 forms beam spot 324 below the main axis 350 in y-direction. The gap 445 between the edge of the wafer and the inner surface of an object equals to distance 440, $|d_{440}|$ minus distance 365, $|d_{obj}|$. In general, the following equation calculates the gap between the edge of the wafer and the inner surface of the object:

$$\text{gap} = d_{obj} + d_{edge} \tag{1}$$

where $d_{obj}$ is the distance from the object inner surface 320 to the reference plane 330, and $d_{edge}$ is the distance from the reference plane to the edge of the wafer. When the beam spot 324 is below the main axis 350 in y-direction, the object surface 320 is on the right of the reference plane 330 and $d_{obj}$ is negative, as shown in FIG. 4C. Whereas when the reference plane 330 is on the right of the edge 410 of the wafer, $d_{edge}$ is negative, as shown in FIG. 4A. Under the condition that the reference plane 330 is at the edge 410 of the wafer, gap=$d_{obj}$.

Figure 5A:
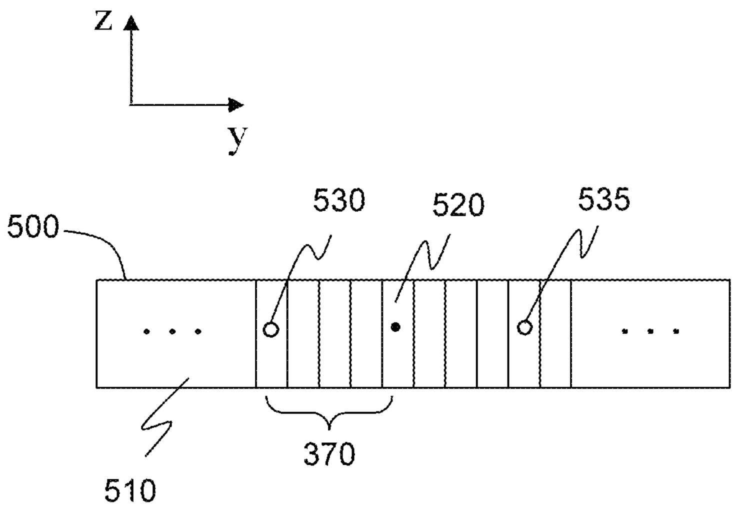
FIG. 5A and FIG. 5B illustrate imaging sensor arrays at the image plane.
Figure 5B:
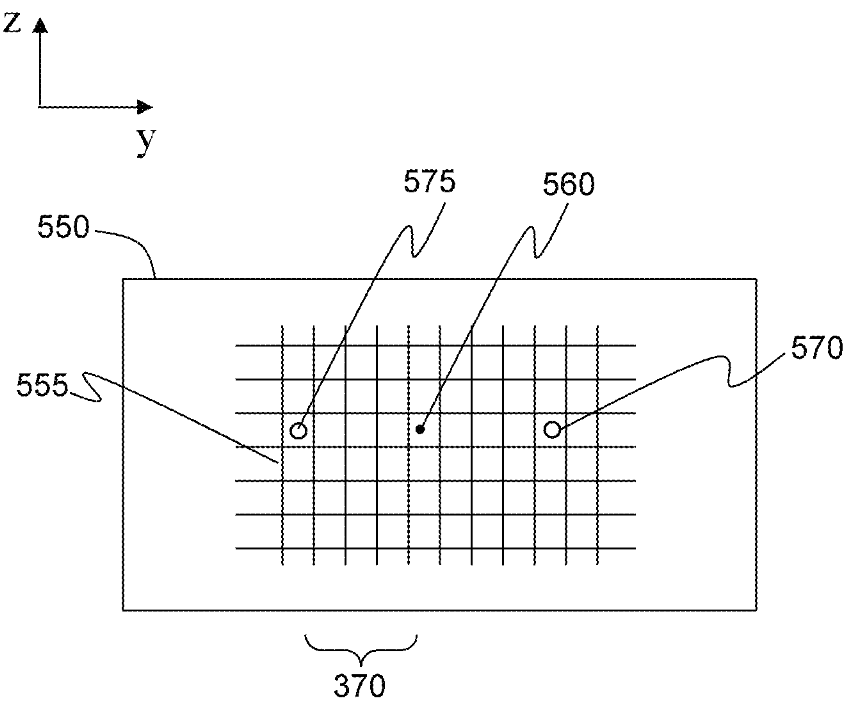

Referring now to FIGS. 5A and 5B, in view of FIG. 3, assembly 300 includes an imaging sensor array placed at the image plane 340 (y-z plane). FIG. 5A shows a linear image array 500, comprising a plurality of imaging pixels 510 arranged in y-direction on y-z plane. The main axis 350 of assembly 300 intersects the image array 500 at location 520, and the image spot 344 is detected by the imaging sensor array at location 530. The distance between location 520 and 530 corresponds to the distance 370, which is proportional to the value of $d_{obj}$. As described above, the reference plane 330 can be on the left side of the object surface 320 in FIG. 4C, and the beam spot 324 is below the main axis 350 in y-direction. Under this condition, the image spot 535 is on the right side of location 520, and $d_{obj}$ is negative.

FIG. 5B shows a 2-dimensional image array 550, comprising a plurality of imaging pixels 555 arranged in y-z plane. The main axis 350 of assembly 300 intersects the 2-dimensional image array 550 at location 560, and the image spot 344 is detected by the imager at location 570 or 575 depending on the location of the reference plane 330 relative to the object surface 320.

Figure 6A:
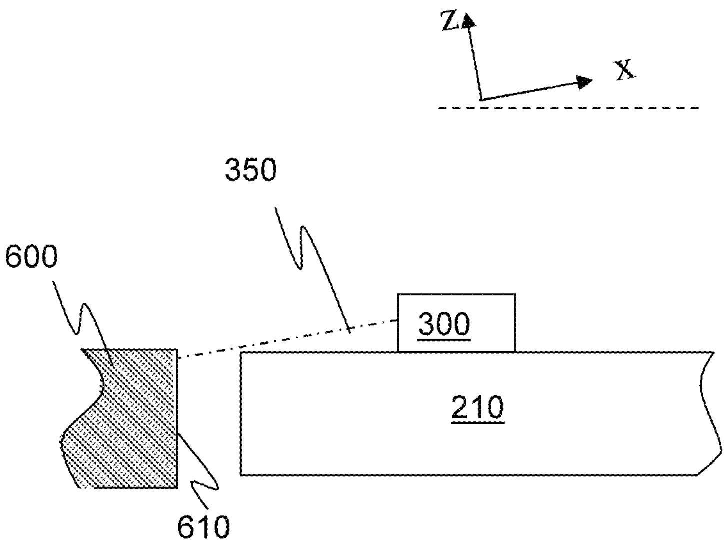
FIG. 6A and FIG. 6B illustrate one configuration of the assembly shown in FIG. 3 according to some embodiments of the present disclosure.
Figure 6B:
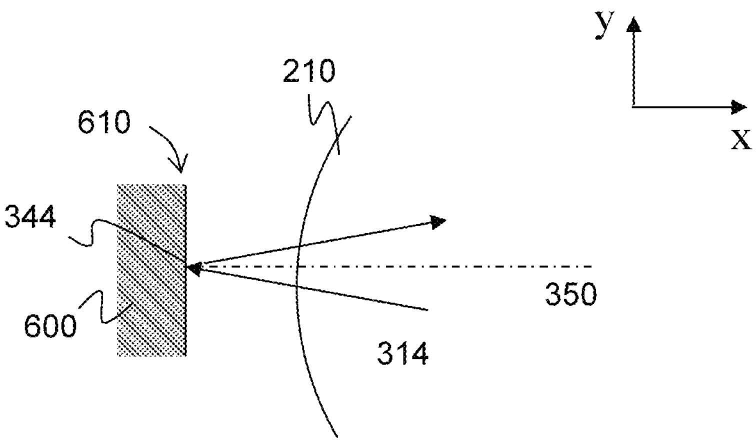

The main axis 350 of the low-profile assembly 300 is configured to approximately parallel to the wafer with less than a few mm distance above the surface. In order to intersect with the inner surface of a nearby object, the main axis may be titled with a small angle. As shown in FIG. 6A, and in view of FIGS. 2A and 2B and FIG. 3, in the x-z plane, where the top of the object is at about the same level as the wafer 210, the main axis 350 is titled downward to intersect the inner surface 610 of the object 600. In this case, the x-axis is rotated around y-axis, and has a small angle with the surface of the wafer. The gap between the edge of the wafer 210 and the object surface 610 derived from Formular (1) need to be corrected according to the tilting angle between the main axis 350 and the surface of the wafer 210. FIG. 6B, in the x-y plane, shows the incident beam 314 formed beam spot 344 on the inner surface 610 of the object 600. On the image plane 340, the image spot 344 will be detected by the imaging sensor array 500 or 550. Detailed calculation of the distances is apparent to those skilled in the art in the scope of the invention and need not be described in more detail herein.

Figure 7:
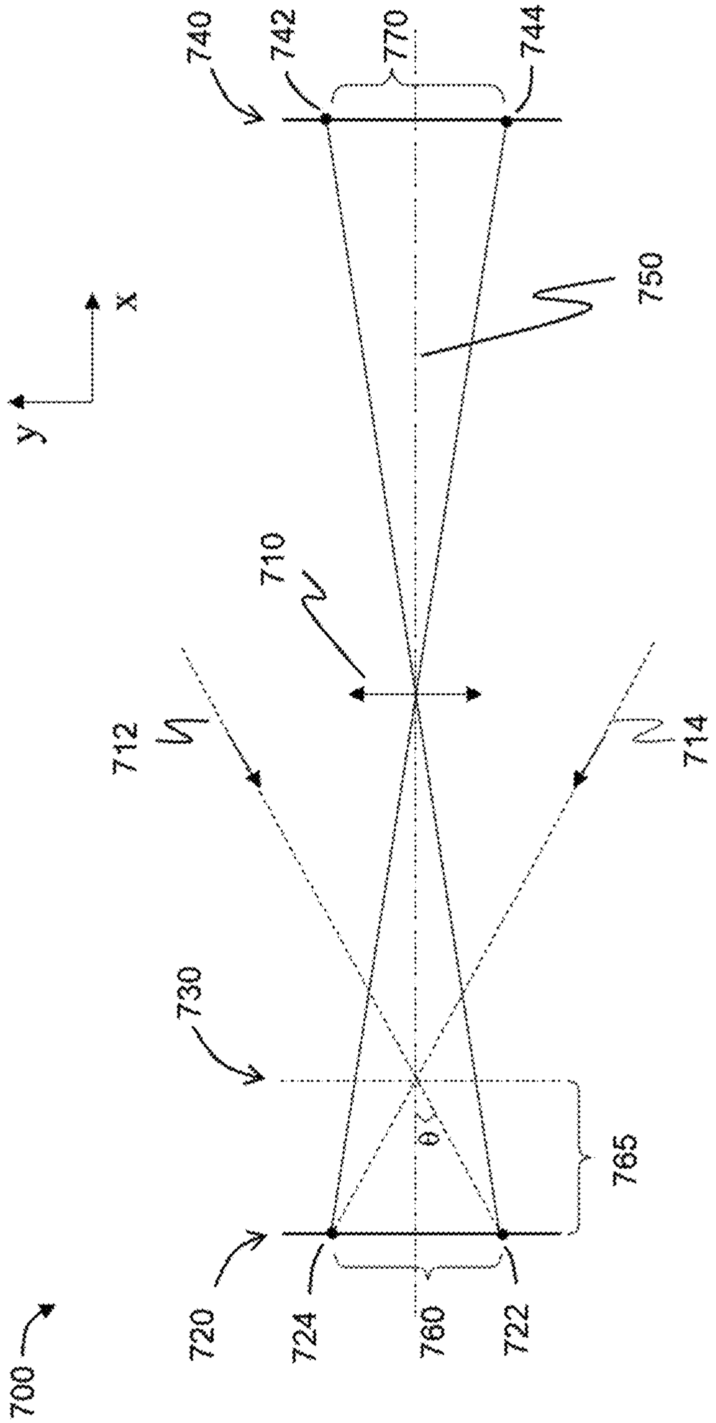
FIG. 7 is a ray tracing diagram of an assembly according to some embodiments of the present disclosure.

According to an alternative embodiment of the present invention, a low-profile assembly 220 in FIGS. 2A and 2B may include two projectors to project two electromagnetic beams to improve measurement accuracy. As shown in FIG. 7, the low-profile assembly 700 comprises a main axis 750 directed to a first direction (x-axis) and approximately parallel to the surface of the wafer 210 (FIGS. 2A and 2B) to intersect the inner surface 720 of a nearby object. The assembly includes a first and a second projector for projecting a first 712 and a second 714 electromagnetic beams onto the surface of the object 720, wherein the first and the second beam are configured to be symmetrical about the main axis 750 and to intersect with each other at a reference plane 730. The projections of the first and second beam produce a first 722 and second beam spot 724 on the surface of the object 720. The distance 765, $d_{obj}$, from the object surface 720 to the reference plane 730 along x-axis is proportional to $d_{760}$ which is the separation between the first 722 and second spot 724 along y-axis:

$$d_{obj} = \frac{d_{760}}{2} \times \cot\theta,$$

where θ is the angle between the main axis 750 and the incident beam 712 or 714. cot θ can be obtained by a calibration from a set of known $d_{obj}$ and $d_{760}$. In one embodiment, the angle, θ, can be configured as 45°. Under this condition, $d_{obj}=(d_{760})/2$.

As shown in FIG. 7, the low-profile assembly 700 further comprises a focusing means 710, such as a focusing lens, centered on the main axis for focusing the reflected beams of the spot 722 and 724 from the object surface, and forming images of the spot 742 and 744 on an image plane 740. The separation 770, $d_{770}$, between the image spot 742 and 744 y-axis is proportional to the separation 760, $d_{760}$, and in turn is proportional to the distance 765, $d_{obj}$. Therefore, $d_{obj}$ can be determined according to $d_{770}$.

FIGS. 8A, 8B, 8C, 8D, and 8E further illustrate various relationships between the object surface 720, reference plane 730, and an edge of a wafer 810 for the assemble 700 shown in FIG. 7. Shown in FIG. 8A, the distance 765, $d_{obj}$ from the object surface 720 to the reference plane 730 along the x-axis can be calculated according to the separation 760, $d_{760}$. Since the reference plane 730 is on right side of the object surface 720, and the distance 765, $d_{obj}$ in formular (1) is positive. The edge 810 of the wafer is located on the left side of the reference plane 730, and the distance 820, $d_{edge}$, is negative. According to formular (1), the gap 825 between the edge of the workpiece and the inner surface of an object equals to the value of $|d_{obj}|$ minus $|d_{edge}|$.

Figure 8A:
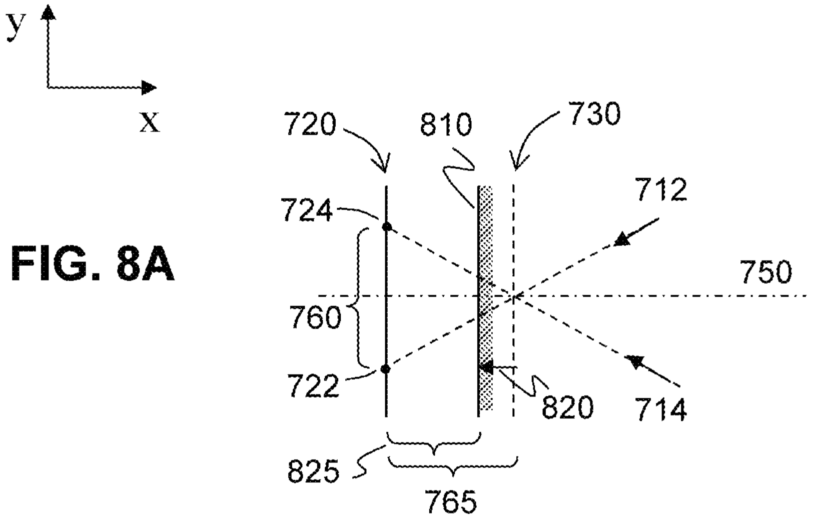
Figure 8B:
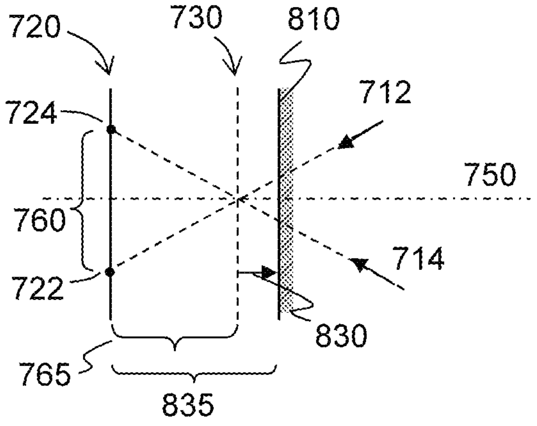
Figure 8C:
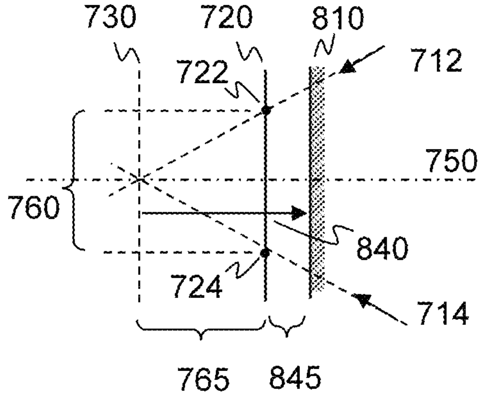

Referring now to FIG. 8B and FIG. 8C. In either case, the separation 760 between beam spot 722 and 724 are the same as that shown in FIG. 8A. The distance 835 or 845, $d_{edge}$, is positive, since the edge 810 of the wafer is located on the right side of the reference plane 730. However, unlike the situation of using single beam shown in FIG. 4C, it is not possible to determine whether the reference plane 730 is on the left or right side of the object surface 730 merely by referencing the two beam spots 722 and 724 together.

One solution for avoiding the sign of the distance, $d_{obj}$, is to arrange the reference plane to be inside of the edge of the workpiece 810, as shown in FIG. 8A. Under this condition, the reference plane 730 has to be on the right side of the object surface (i.e. $d_{obj}>0$).

Another solution to detect the sign of the reference distance, $d_{obj}$, is to momentarily block or shut off one of the two incident beams. As shown in FIG. 8D and FIG. 8E, beam 712 is momentarily blocked, and there is only one beam spot 724 from beam 714 formed on the object surface 720 for a moment. In FIG. 8D, when the reference plan 730 is on the right side of the object surface 720, the beam spot is above the main axis 750 as in y-direction, and the reference distance 765, $d_{obj}$ is positive. Referring back to FIG. 8B, the gap 835 between the edge of the wafer and the inner surface of an object equals to $|d_{obj}|$ plus $|d_{edge}|$.

In FIG. 8E, when the reference plan 730 is on the left side of the object surface 720, the beam spot is below the main axis 750 as in the y-direction, and the reference distance 765, $d_{obj}$ is negative, and the gap 845 between the edge of the wafer and the inner surface of an object equals to $|d_{edge}|$ minus $|d_{obj}|$.

Under the condition that the reference plane 730 is at the edge 810 of the wafer, gap=$d_{obj}$.

Figure 9A:
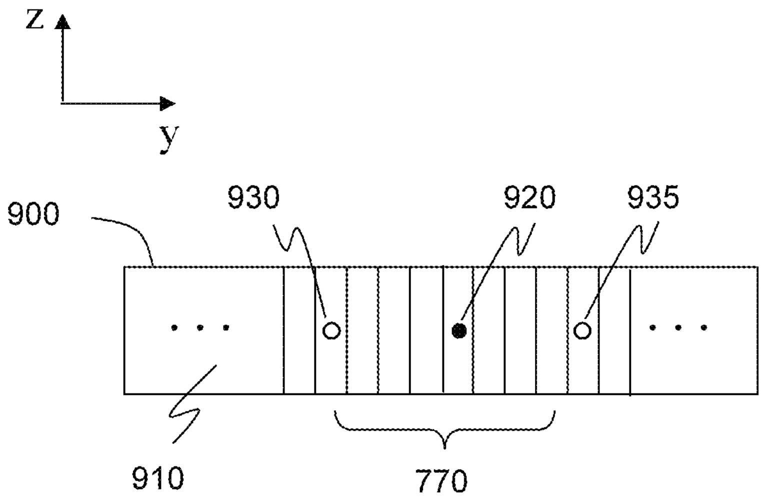
FIG. 9A and FIG. 9B illustrate imaging sensor arrays at the image plane.
Figure 9B:
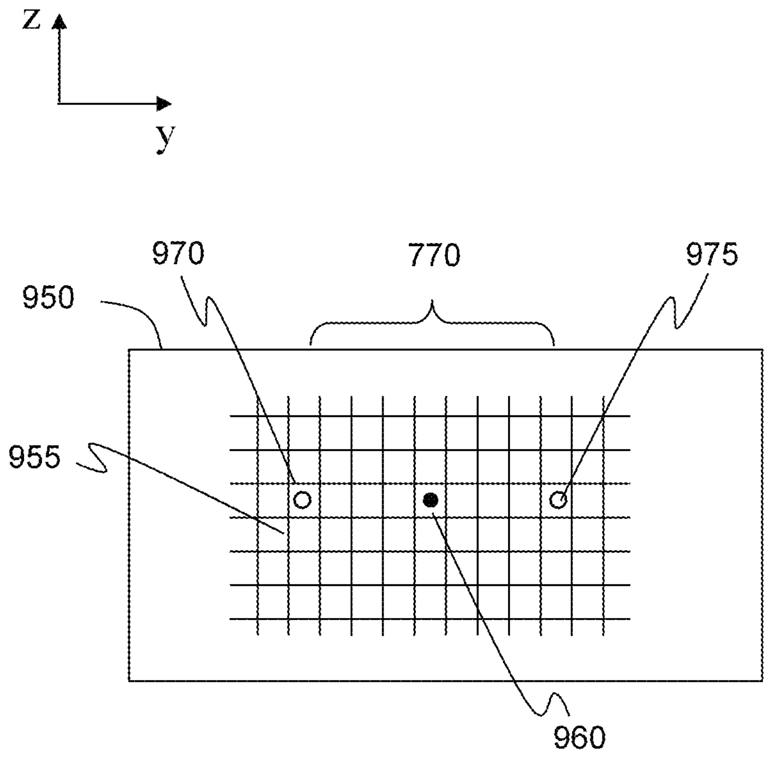

Referring now to FIGS. 9A and 9B, in view of FIG. 7, assembly 700 includes an imaging sensor array placed at the image plane 740 (y-z plane). FIG. 9A shows a linear imaging sensor array 900, comprising a plurality of imaging pixels 910 arranged in y-direction. FIG. 9B shows a 2-dimensional imaging sensor array 950, comprising a plurality of imaging pixels 955 arranged in z- and y-direction. The main axis 750 of assembly 700 intersects the image array 900 or 950 at location 920 or 960 respectively. In FIG. 9A, the image spots 742 and 744 (of the FIG. 7) are detected by the imaging sensor array at location 930 and 935 respectively. In FIG. 9B the image spots 742 and 744 are detected by the imaging sensor array at location 970 and 975 respectively. The distance between location 930 and 935 or between 970 and 975 corresponds to the distance 370, which is proportional to the value of $d_{obj}$. As described above, the sign of the reference distance, $d_{obj}$, can be determined by temporarily blocking one of the beams and detecting the position of remaining image spot on the image plane. Using the relative position of the image spot against location of 920 or 960, the sign of $d_{obj}$ can be determined.

Figure 10A:
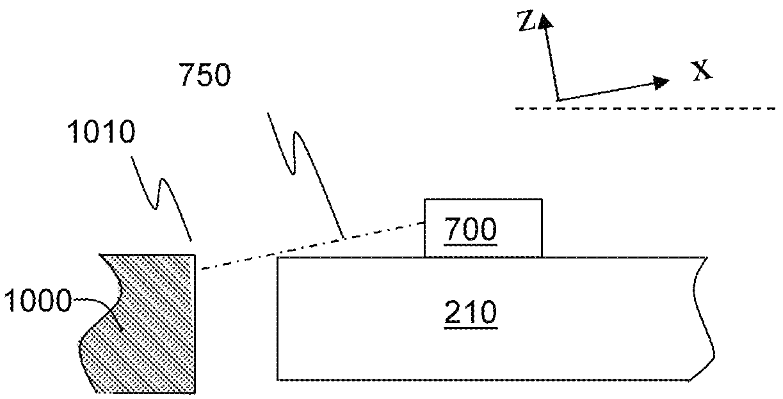
FIG. 10A and FIG. 10B illustrate one configuration of the assembly shown in FIG. 7 according to some embodiments of the present disclosure.
Figure 10B:
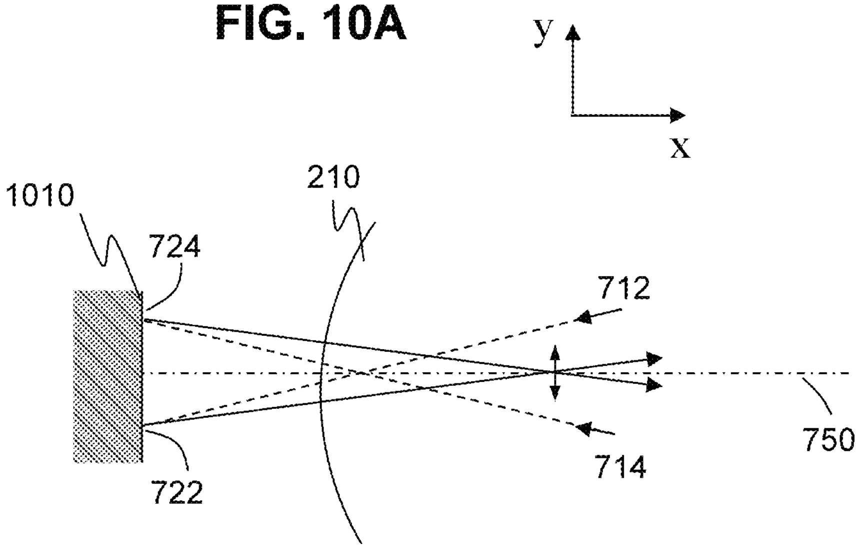

The main axis 750 of the low-profile assembly 700 is configured to approximately parallel to the surface of the wafer to satisfy a low-profile design for the assembly. The main axis may need to be tilted slightly to intersect with the inner surface of a nearby object. As shown in FIG. 10A, in the x-z plane, the main axis 750 is titled downward to intersect the inner surface 1010 of the object 1000. The x-axis is rotated around y-axis, and has a small angle with the surface of the wafer. The gap between the edge of the wafer 210 and the object surface 1010 derived from Formular (1) will be corrected according to the tilting angle between the main axis 750 and the surface of the wafer 210. FIG. 10B, in the x-y plane, shows the incident beams 712 and 714 projected beam spots 722 and 744 on the inner surface 1010 of the object 1000. On the image plane 740 shown in FIG. 7, the image spot 742 and 744 will be detected by the imaging sensor array 900 or 950.

Various types of commercially available image sensor can be used for imaging sensor array 500, 550, 900, or 950. Some examples include charge-coupled device (CCD) sensors, complementary metal-oxide-semiconductor sensors (CMOS), amorphous silicon sensing matrix, and infrared thermal imaging array. The accuracy of a measurement depends on both image array pixel resolution and beam path arrangement. These image sensors are well known to those skilled in the art of image sensing applications and need not be described in more detail herein.

According to some embodiments of the present invention, in the low-profile assembly 300 or 700, the electromagnetic beam 250 is characterized by a wavelength spectrum selected from visible light, microwave, infrared light, and ultraviolet light. The focusing means 310 or 710 can be a focus lens having a variable focus length or having a larger depth of field for clear image formation.

Figure 11A:
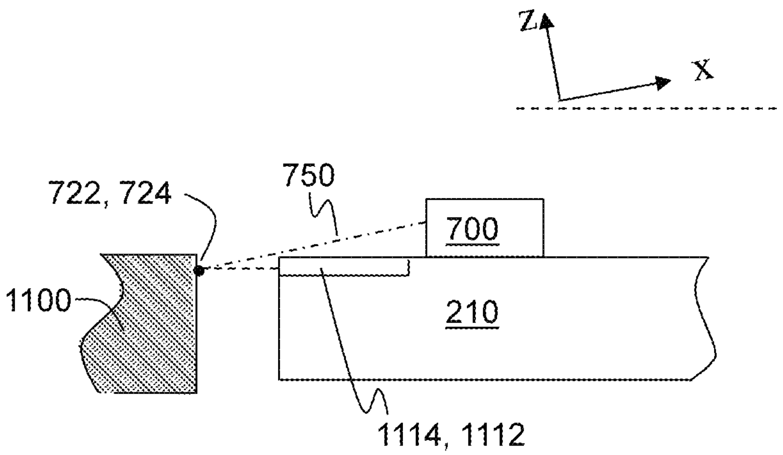
FIG. 11A and FIG. 11B illustrate one configuration of the assembly shown in FIG. 7 according to some embodiments of the present disclosure.
Figure 11B:
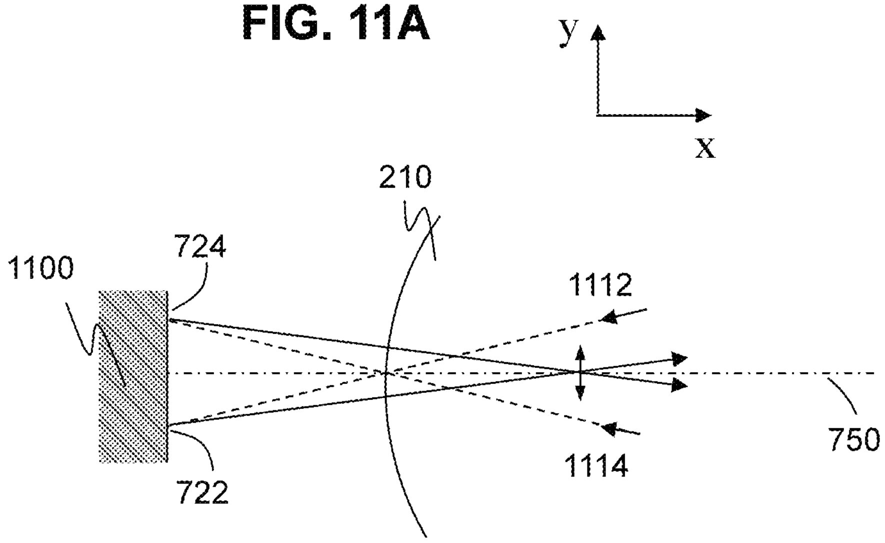

In one embodiment, the projector of assembly 300 or 700 can be a solid state light source such as a semiconductor laser or LED device. Alternatively, an incident beam can be constructed by an optical fiber coupling to a light source. FIGS. 11A and 11B depicts such arrangement for the assembly 700 where two beam system is constructed. FIG. 11A is a side view of a section near the edge of a wafer 210 and a nearby object 1100. As shown in FIG. 11A, optical fibers or waveguides 1112, and 1114 are embedded into the wafer surface near the edge. This arrangement is to maintain the surface clearance near the edge zone of the wafer for robot wafer handling and inspecting operation. Since the beams intersect with the inner surface of object 1100 below the surface of wafer 210, the main axis 750 is tilted downward for detecting the beam spots 722 and 724. Alternatively, the optical fibers can be mounted on the wafer surface but in the center zone of the wafer to maintain the clearance in the edge zone. The optical fibers or waveguides are coupled to light sources in the assembly 700. FIG. 11B shows a top view of the beam paths. In one embodiment, the edge of the wafer 210 is overlap with a reference point on the reference plane 730. Similar arrangement can be also applied to assembly 300.

Figure 12A:
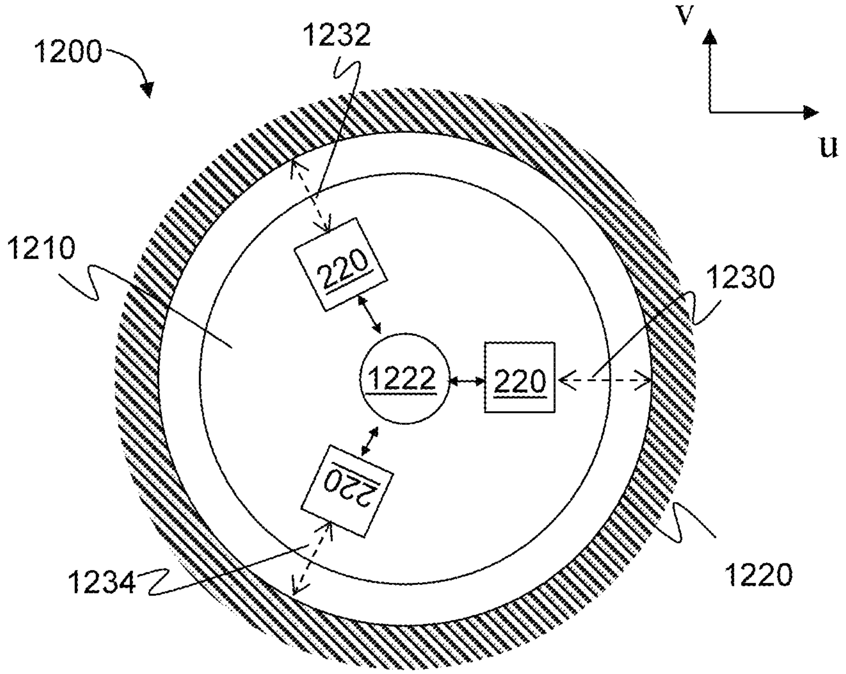
FIG. 12A and FIG. 12B are illustrations of a system for contactless object measurement according to some embodiments of the present disclosure.
Figure 12B:
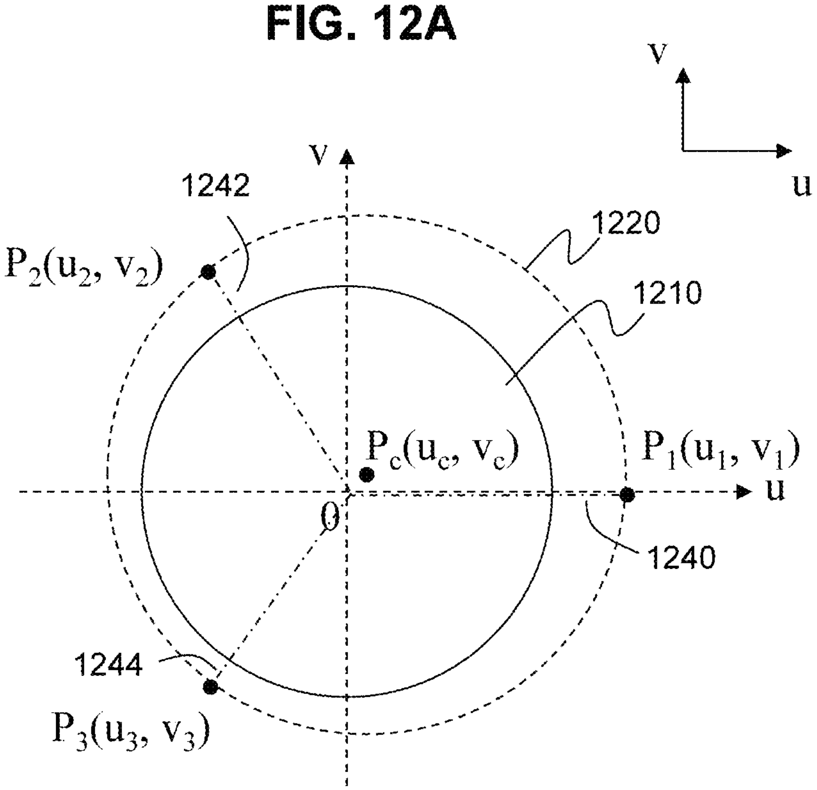

With reference to FIGS. 12A and 12B, in according to another embodiment of the present invention, the contactless object measurement system 1200 is configured to map the location of the wafer 1210 relative to the inner rim of the focus ring 1220 to monitor the deviation from the concentric condition. The system 1200 comprises a central controller 1222 coupled to three of low-profile assembly 220 which are attached on the wafer 1210. In a u-v coordinate, the main axis of each assembly 1230, 1232, and 1234, are orientated to three different directions. The control unit 1222 includes an image processing electronics to calculate gaps between wafer edge and the inner rim of the focus ring along each main axis of the assemblies. The central controller also includes a power source to provide power to the assemblies and components in the controller. The central control unit 1122 may also include data storage memory and/or data communication electronics for wired or wireless communication.

Referring to FIG. 12B, in a u-v coordinate, the wafer center is located at (0, 0) position, and $P_c(u_c, v_c)$ is the center of the focus ring 1220. With the methods described above, positions of three points $P_1(u_1, v_1)$, $P_2(u_2, v_2)$, and $P_3(u_3, v_3)$ at the intersects between the main axis and the inner rim of the focus ring 1220 can be determined:

$u_i=(r+gap_i)\times\cos\varphi_i$ and $v_i=(r+gap_i)\times\sin\varphi_i$, where i is 1 to 3, r is the radius of the wafer, gap (1240, 1242, or 1244) is the distance from the edge of the wafer to the intersect of the focus ring on each main axis, 1230, 1232, or 1234 respectively. $\varphi$ is the angle between u-axis and the main axis 1230, 1232, or 1234. The inner rim of the focus ring 1220 can be described by equation:

$$(u-u_c)^2+(v-v_c)^2=R^2 \tag{2}$$

where $u_c$ and $v_c$ are the u and v coordinates of the center of the focus ring, and R is the radius of the focus ring. The value of $u_c$, $v_c$, and R can be obtained by solving equation (2) with numerical fitting of the coordinates of $P_1(u_1, v_1)$, $P_2(u_2, v_2)$, and $P_3(u_3, v_3)$. More assemblies may be used to improve the accuracy for measuring the relative position between a wafer and the focus ring, though three assemblies are the minimum requirement to define a circle. The calculations of $u_c$, $v_c$, and R are performed by the image processor in the centra control unit.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

The invention claimed is:

1. A system comprising: a workpiece, at least one low-profile assembly, and a central control unit; wherein the central control unit comprises a power source and an image processor; the at least one low-profile assembly and the central control unit are attached on a surface of the workpiece; the at least one low-profile assembly comprises:

a main axis directed to a first direction and approximately parallel to the surface of the workpiece to intersect an inner surface of a nearby object;

a projector for projecting an electromagnetic beam onto the nearby object; wherein the electromagnetic beam is configured to intersect with the main axis at a reference plane; the projection of the electromagnetic beam produces a beam spot on the inner surface of the nearby object; the separation between the beam spot and the main axis along a second direction is proportional to a distance from the inner surface of the nearby object to the reference plane;

a focusing means centered on the main axis for focusing a reflected beam from the beam spot on the inner surface of the nearby object, and forming an image of the beam spot on an image plane; and an imaging sensor array placed at the image plane and coupled with the image processor in the central control unit for determining a position of the image of the beam spot on the image plane.

2. The system of claim 1, wherein the workpiece is a wafer.

3. The system of claim 1, wherein the electromagnetic beam is characterized by a wavelength spectrum selected from visible light, microwave, infrared light, and ultraviolet light.

4. The system of claim 1, wherein at least three of the low-profile assemblies are attached on the workpiece and have respective main axes aligned in different directions to detect the position of the workpiece relative to its surrounding object.

5. The system of claim 1, wherein the imaging sensor array is selected from CCD, CMOS, amorphous silicon sensing matrix, and infrared thermal imaging array.

6. The system of claim 1, wherein the projector is made of a solid state light source coupled to an optical fiber.

7. A method for contactless measurement of a distance between a workpiece and a nearby object, the method comprising:

constructing a system comprising a workpiece, at least one low-profile assembly, and a central control unit; wherein the central control unit comprises a power source and an image processor; the at least one low-profile assembly and the central control unit are attached on a surface of the workpiece; the at least one low-profile assembly comprises:

a main axis directed to a first direction and approximately parallel to the surface of the workpiece to intersect an inner surface of the nearby object;

a projector for projecting an electromagnetic beam onto the nearby object; wherein the electromagnetic beam is configured to intersect with the main axis at a reference plane; the projection of the electromagnetic beam produces a beam spot on athe inner surface of the nearby object; the separation between the beam spot and the main axis along a second direction is proportional to a distance from the inner surface of the nearby object to the reference plane;

a focusing means centered on the main axis for focusing a reflected beam from the beam spot on the inner surface of the nearby object, and forming an image of the beam spot on an image plane; and an imaging sensor array placed at the image plane and coupled with the image processor in the central control unit for determining a position of the image of the beam spot on the image plane;

determining, by the image processor in the central control unit, the a distance $d_{obj}$, from the inner surface of the nearby object to the reference plane, according to a distance, in the second direction, between the image spot and an intersection of the main axis with the image plane.

8. The method of claim 7 further comprises determining a gap between an edge of the workpiece and the inner surface of the nearby object, according to the equation:

gap $=d_{obj}+d_{edge}$, wherein $d_{edge}$ is a distance from the reference plane to the edge of the workpiece.

9. The method of claim 7, wherein the nearby object is a focus ring disposed on a chuck in a plasma processing chamber.

10. A system comprising: a workpiece, at least one low-profile assembly, and a central control unit; wherein the central control unit comprises a power source and an image processor; the at least one low-profile assembly and the central control unit are attached on a surface of the workpiece; the at least one low-profile assembly comprises:

a main axis directed to a first direction and approximately parallel to the surface of the workpiece to intersect an inner surface of a nearby object;

a first projector and a second projector for projecting a first electromagnetic beam and a second electromagnetic beam onto the inner surface of the nearby object; wherein the first and the second electromagnetic beams are configured to be symmetrical about the main axis and to intersect with each other at a reference plane;

the projections of the first and the second electromagnetic beams produce a first beam spot and a second beam spots on the inner surface of the nearby object; the separation between the first and the second beam spots along a second direction is proportional to a distance from the inner surface of the nearby object to the reference plane;

a focusing means centered on the main axis for focusing respective reflected beams from the first and the second beam spots on the inner surface of the nearby object, and forming images of the first and the second beam spots on an image plane; and an imaging sensor array placed at the image plane and coupled with the image processor in the central control unit for determining the positions of the images of the first and the second beam spots on the image plane.

11. The system of claim 10, wherein an edge of the workpiece is between the reference plane and the inner surface of the nearby object.

12. The system of claim 10, wherein an edge of the workpiece is at the reference plane.

13. The system of claim 10, wherein the workpiece is a wafer.

14. The system of claim 10, wherein each of the electromagnetic beam is characterized by a wavelength spectrum selected from visible light, microwave, infrared light, and ultraviolet light.

15. The system of claim 10, wherein at least three of the low-profile assemblies are attached on the workpiece and have respective main axes aligned in different directions to detect the position of the workpiece relative to its surrounding object.

16. The system of claim 10, wherein the imaging sensor array is selected from CCD, CMOS, amorphous silicon sensing matrix, and infrared thermal imaging array.

17. The system of claim 10, wherein the first and the second projectors are made of a solid state light source coupled to optical fibers.

18. A method for contactless measurement of a distance between a workpiece and a nearby object, the method comprising:

constructing a system comprising a workpiece, at least one low-profile assembly, and a central control unit; wherein the central control unit comprises a power source and an image processor; the at least one low-profile assembly and the central control unit are attached on a surface of the workpiece; the at least one low-profile assembly comprises:

a main axis directed to a first direction and approximately parallel to the surface of the workpiece to intersect an inner surface of the nearby object;

a first projector and a second projector for projecting a first electromagnetic beam and a second electromagnetic beam onto the nearby object; wherein the first and the second electromagnetic beams are configured to be symmetrical about the main axis and to intersect with each other at a reference plane;

the projections of the first and the second electromagnetic beams produce a first beam spot and a second beam spot on the inner surface of the nearby object; the separation between the first and the second beam spots along a second direction is proportional to a distance $d_{obj}$ from the inner surface of the nearby object to the reference plane;

a focusing means centered on the main axis for focusing respective reflected beams from the first and the second beam spots on the inner surface of the nearby object, and forming images of the first and the second beam spots on an image plane; and an imaging sensor array placed at the image plane and coupled with the image processor in the central control unit for determining positions of the image of the first and the second beam spots on the image plane;

determining, by the image processor in the central control unit, the distance, $d_{obj}$, from the inner surface of the nearby object to the reference plane, according to a distance between the first and the second images of the beam spots on the image plane in the second direction.

19. The method of claim 18 further comprises determining a gap between an edge of the workpiece and the inner surface of the nearby object, according to the equation:

gap=$d_{obj}$+$d_{edge}$, wherein $d_{edge}$ is the distance from the reference plane to the edge of the workpiece.

20. The method of claim 18, wherein the first and the second electromagnetic beams are operated together to determine the distance, $d_{obj}$, from the inner surface of the nearby object to the reference plane.

21. The method of claim 18, wherein one of the first and the second electromagnetic beams is operated to determine whether $d_{obj}$ is positive or negative.

22. The method of claim 18, wherein the nearby object is a focus ring disposed on a chuck in a plasma processing chamber.

* * * * *